June 27, 1967 E. O. P. TATTER 3,328,034

AUTOMATIC RECORD CHANGER

Filed March 17, 1964

5 Sheets-Sheet 1

INVENTOR.

Ernest O. P. Tatter

BY

Hofgren, Wegner,
Allen, Stellman & McCord Attys

June 27, 1967 E. O. P. TATTER 3,328,034

AUTOMATIC RECORD CHANGER

Filed March 17, 1964

5 Sheets-Sheet 3

June 27, 1967 E. O. P. TATTER 3,328,034

AUTOMATIC RECORD CHANGER

Filed March 17, 1964

5 Sheets-Sheet 5

United States Patent Office 3,328,034

Patented June 27, 1967

3,328,034

AUTOMATIC RECORD CHANGER

Ernest O. P. Tatter, Addison, Ill., assignor to Warwick Electronics Inc., a corporation of Delaware Filed Mar. 17, 1964, Ser. No. 352,506
12 Claims. (Cl. 274—10)

This invention relates in general to a record changer and more particularly to a record changer with a mechanism for supporting a record ejected from the bottom of a record stack during the entire movement of the record to the turntable.

In the past, in changers having a spindle supporting a stack of records threaded thereon above the turntable when the lowermost record of the stack was ejected from a spindle shelf, the record freely dropped onto a rotating turntable or onto a record already on the turntable. This method of record changing has proved both irritating to the listener and harmful to the records being played.

The noise and record clatter created by dropping a record onto a moving turntable from its supported position above the turntable is unpleasant and annoying. Even more objectionable is the damage caused to the phonograph records. The playing life of the records is reduced and the quality of the sound produced is impaired particularly since the edge of a descending record can contact the sound grooves of a record already on the turntable.

With a view to obviating the above mentioned problems, it has been proposed in the copending patent application Ser. No. 276,253 of Ernest O. P. Tatter and Paul W. Schaff for a Record Changer, filed Apr. 29, 1963, to provide a record changer having a spindle extending upwardly and centrally of a turntable and supported by a motor board, said spindle having a shelf for supporting a stack of records above the turntable; and retractable support means extending outwardly of the spindle for receiving a record ejected from the shelf on the spindle, the support means being mounted for movement lengthwise of the spindle for lowering a record ejected from the shelf of the spindle to the turntable and depositing the record thereon.

The principal object of the present invention is to provide a new record lowering mechanism, which is an improvement over the mechanisms referred to above.

Another object of the present invention is to provide means for positively dislodging the lowermost record of a record stack from the remaining records of the record stack, when it is desired to lower the lowermost record to the turntable.

A further object of the present invention is to provide in a record changer having a record lowering mechanism including fingers retractably mounted in the record changer spindle, means for retaining the record to be lowered in continuous engagement with the record lowering fingers.

Still another object of the present invention is to provide in a record changer as described in the preceding paragraph means for elevating the record lowering fingers, means for stopping the movement of the record lowering fingers just under the lowermost record, timed means for shifting the lowermost record off of the spindle shelf and for raising the record lowering fingers to simultaneously catch the ejected record, means for raising the record lowering fingers after the ejected record is positioned thereon to positively separate the ejected record from the adjacent record in the record stack, and means for lowering the record lowering fingers to position and record on the turntable.

Further objects and advantages of the invention will hereinafter become fully apparent from the following detailed description taken in connection with the accompanying drawings wherein.

Figures 1, 2:
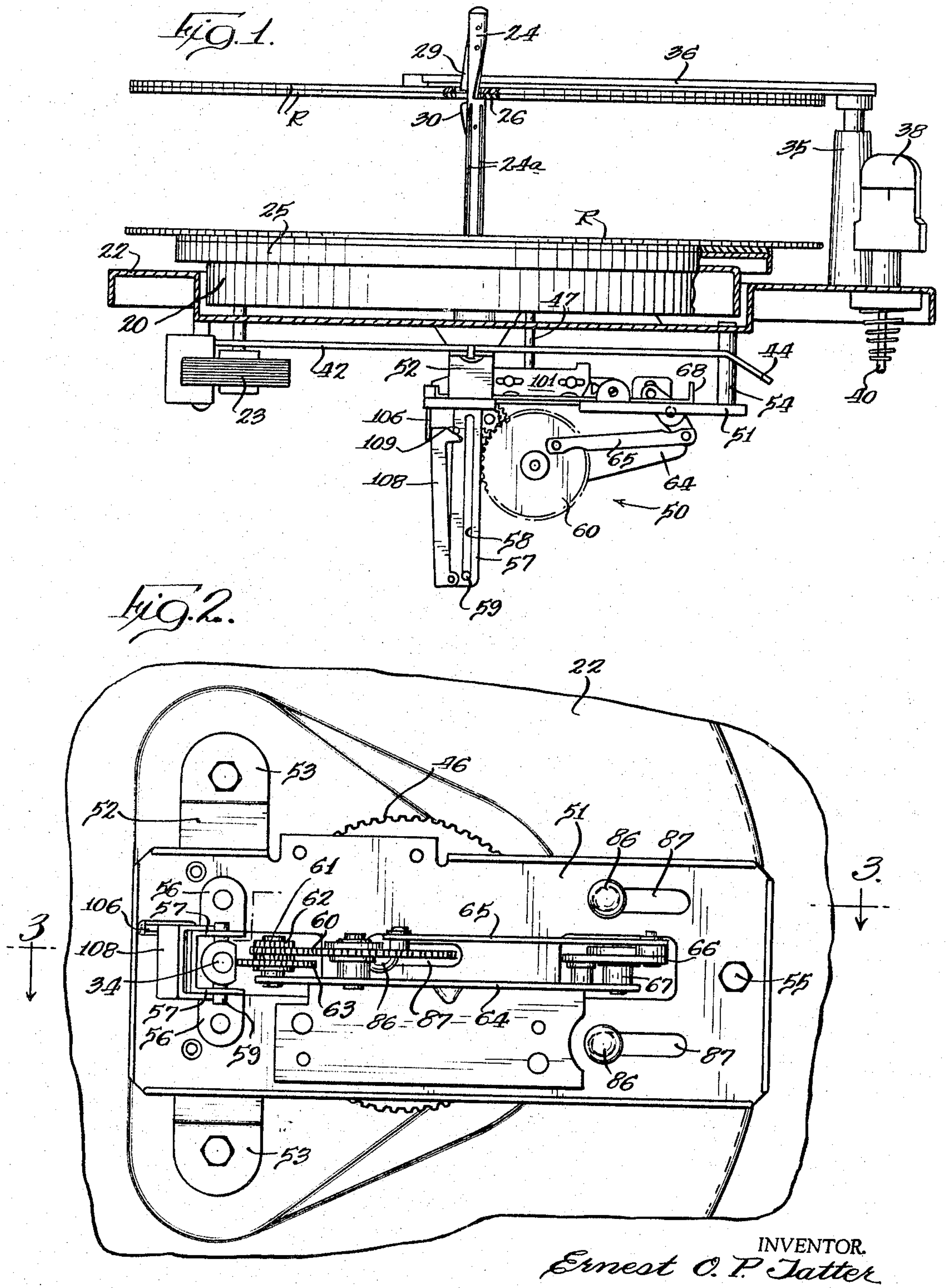
FIG. 1 is a side elevational view of a preferred embodiment of the invention with parts in section and broken away.
FIG. 2 is an enlarged, fragmentary bottom plan view of the record lowering mechanism used in the embodiment shown in FIG. 1.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings, the preferred embodiment of the record changer has a first turntable 20 above a motor board 22 and supported thereon for rotation. The motor board 22 can be mounted within a phonograph cabinet or on a support (not shown). The turntable 20 is rotatable at a selected speed by a turntable motor 23 and speed change mechanism fixedly connected to the motor board 22.

A second turntable 25 which is concentric with turntable 20 is positioned above turntable 20 and is substantially parallel thereto. Upper turntable 25 is drivingly rotated by lower turntable 20 through the medium of a suitable frictional material 27 that is interposed therebetween. Upper turntable 25 is centrally supported by a washer 25a which, in turn, is carried on a bushing 28. Washer 25a is made of a low frictional material so that the mating surfaces of washer 25a and bushing 28 move relatively free of friction. The upper turntable can be stopped during lowering of a record in the manner described in the above mentioned Tatter and Schaff application.

Extending upwardly and centrally of the turntable 25 is a spindle 24 which is supported by the motor board 22. The spindle 24 has a shelf 26 for supporting a stack of records, which are indicated at R.

Figures 7, 8, 9:
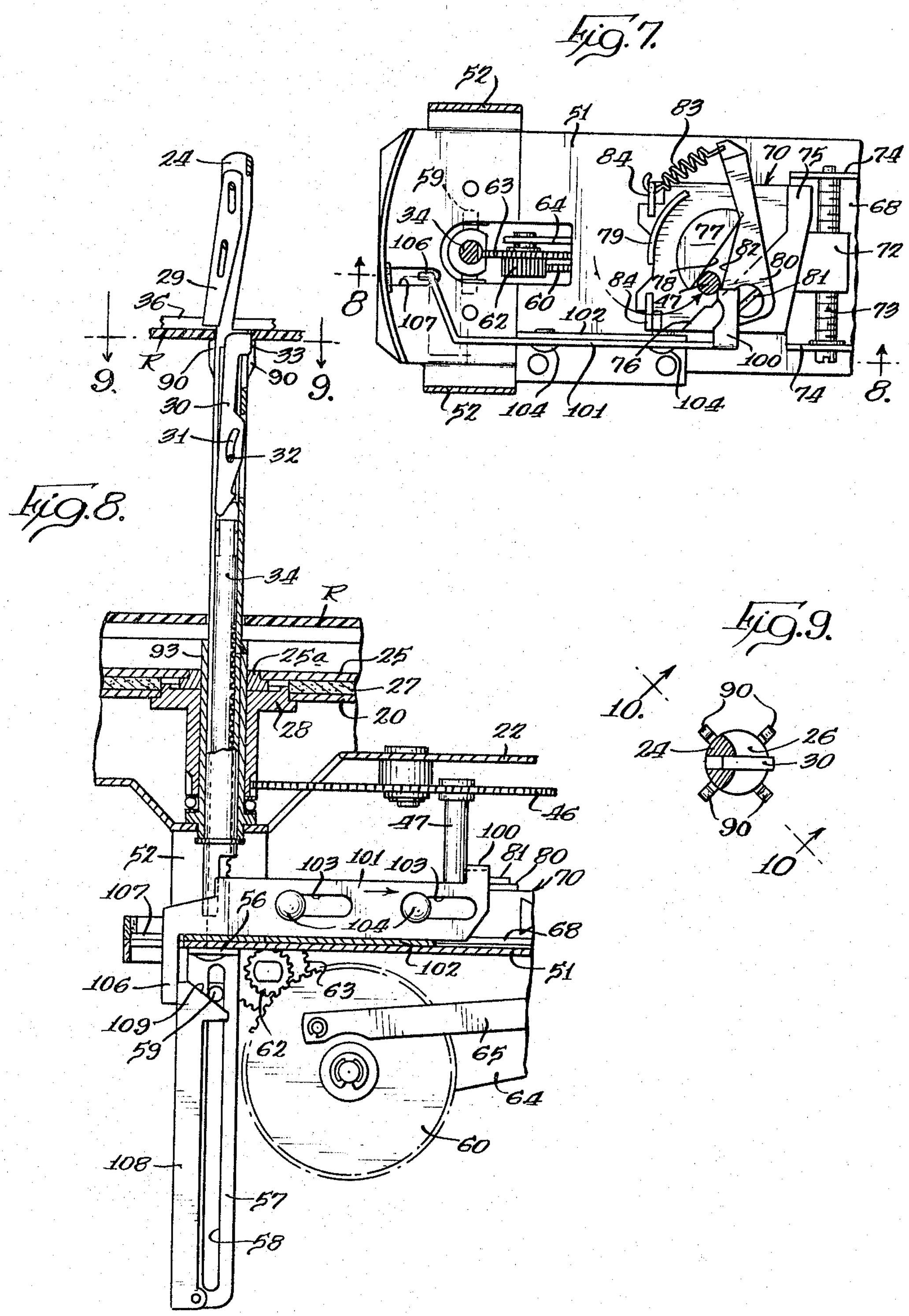
FIG. 7 is a view similar to FIG. 5, but showing the structure at a further point during the record change cycle.
FIG. 8 is a sectional view taken along line 8—8 of FIG. 7.
FIG. 9 is an enlarged sectional view taken along line 9—9 of FIG. 8.

Spindle 24 has a record ejecting mechanism including an ejector lever 30 having an arcuate slot 31. A pin 32 carried by spindle 24 impales slot 31, so that ejector lever 30 is mounted for vertical movement relative to spindle 24, as well as for pivotal movement transversely thereof. As will become readily apparent from the consideration of FIGS. 3, 6 and 8, upper portion 33 of ejector lever 30 travels through a path which shifts the lowermost record of the record stack from the shelf 26 whereby the record is placed in position for lowering movement to the upper turntable 25. Spindle 24 has a retainer plate 29 slidably carried thereon for preventing the other records from being ejected from the shelf 26 by ejector lever 30, as is well known in the art. The operation of ejector lever 30 is effected by vertical movement of a push rod 34 passing upwardly through the hollow spindle 24 and into engagement with the ejector lever 30 to pivot it into its record ejecting position, as best seen in FIG. 8.

It is, of course, understood that the present invention can likewise be embodied in a phonograph having a side ejector mechanism, that is, one in which the ejector lever is not carried in the record spindle but rather is positioned adjacent the record stack for ejecting a record by engaging the outer edge of such record.

An upright post 35 is mounted on the motor board 22 adjacent the turntable 25. The post 35 has a telescopically mounted, swingable hold down arm 36 for engaging the top record of the record stack to hold records in a horizontal position on the spindle 24 above the turntable 25. As is well known in the art, the arm 36 may be raised and pivoted away from its position overlying the record stack so that the records may be removed from the spindle or more records may be added to the stack. A tone arm 38 is pivotally mounted on motor board 22 in the conventional manner, and is operated in up and down movements by the vertical shift of a tone arm engaging pin 40 which extends beneath the motor board 22 to an exposed position whereupon vertical movement of pin 40 results in corresponding vertical movement of the tone arm 38. A record change cycle, including operation of the record ejecting lever 30 and tone arm 38, causes the inclined flange 44 of a main slide plate 42, which is mounted beneath the motor board for reciprocal movement, as is well known in the art, to actuate pin 40, and other surfaces on main slide 42 actuate tone arm 38 in its pivotal movement.

The means for effecting the reciprocating movement of main slide 42 includes a drive gear 46 that is rotatably supported on motor board 22, and which has a downwardly extending eccentric pin 47 fixed thereon. As is well known in the art, gear 46 remains idle during normal playing conditions, and rotates during a record change cycle. The movement of pin 47 during the record change cycle is utilized to reciprocate main slide 42 as well as to actuate the record lowering means, shown generally at 50 in FIG. 1.

A mounting plate 51 for the record lowering means is secured to the undersurface of motor board 22 at one end by a bracket 52 having outwardly extending feet 53 that are screwed to the motor board. The other end of plate 51 is held in spaced relation from the undersurface of motor board 22 by a spacer 54 which surrounds the shank of an elongate fastener 55.

Figures 5, 6:
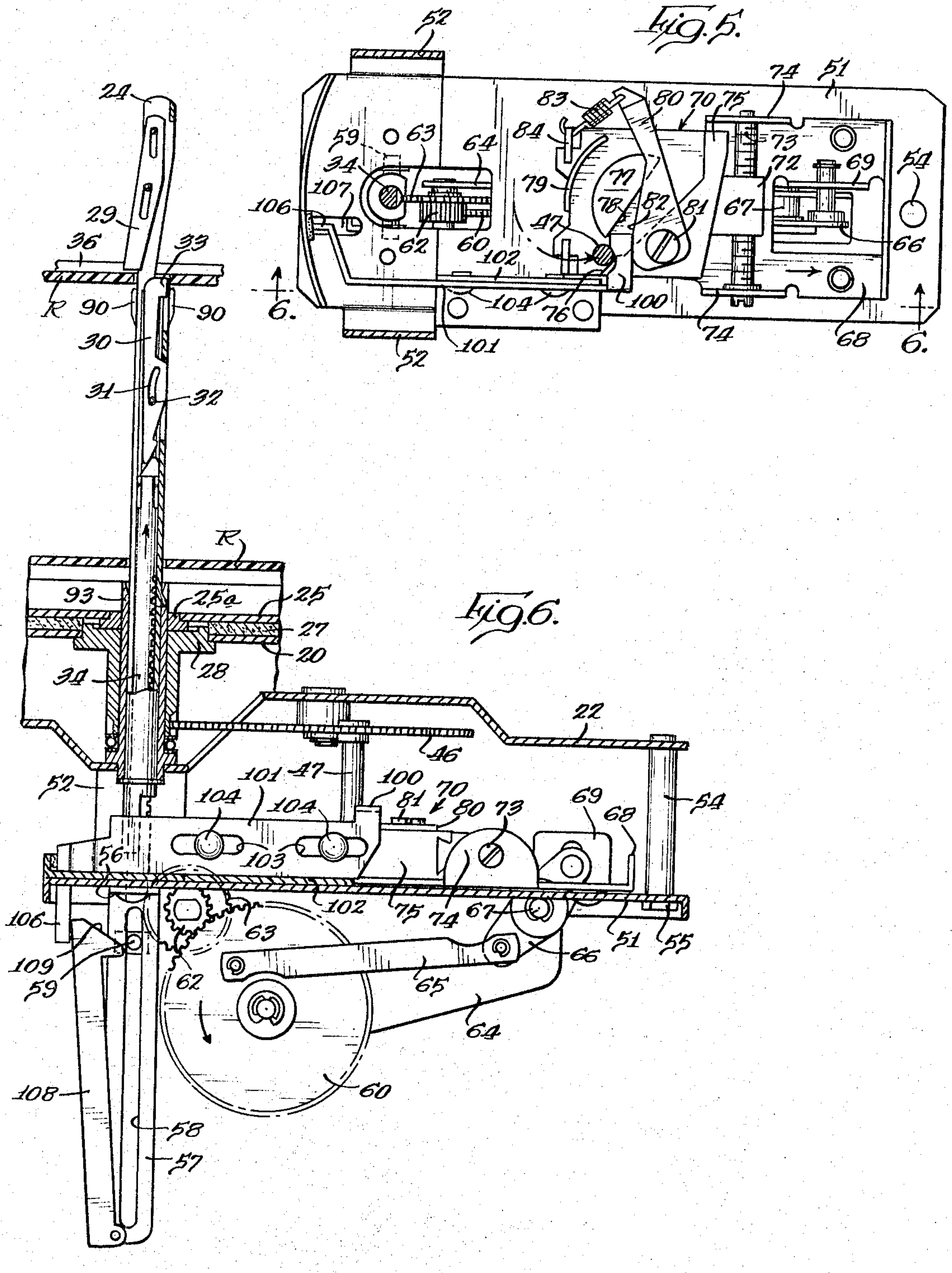
FIG. 5 is a sectional view similar to FIG. 4, but showing the structure at an intermediate step during a record change cycle.
FIG. 6 is a sectional view taken along line 6—6 of FIG. 5.

As can be best seen in FIG. 3, push rod 34 extends below plate 51 through a suitable opening therein, and is provided with a plurality of longitudinally spaced rack teeth 34*a*. A mounting bracket is provided for push rod 34, and includes a pair of outwardly directed feet 56 (FIG. 2), which are secured to the undersurface of plate 51, and downwardly extending sides 57 having vertically disposed slots 58 (FIG. 6). A transverse pin 59 extends through the lower end of push rod 34, and impales slots 58 to nonrotatably guide the push rod in its vertical movement. Vertical movement is imparted to push rod 34 through a compound gear train including driving gear 60, and a pinion 61 having a small diameter gear 62 meshing with gear 60, and a large diameter gear 63 integral with gear 62 and meshing with rack teeth 34*a*. Driving gear 60 and pinion 61 are rotatably mounted on a plate 64 which extends downwardly from plate 51.

Driving gear 60 is rotated by a linkage including a transversely extending link 65 which is pivotally secured to gear 60 at a point offset from the rotational axis of the gear. The right hand end of link 65, as viewed in FIG. 3 and FIG. 6, is pivotally connected to the lower end of a generally vertically extending bell-crank 66. The midportion of bell-crank 66 is pivotally connected at 67 to plate 64. The upper end of link 66 is pivotally connected to a flange 69, which is formed integrally with, and extends upwardly from, a slide member 68. A cam 70 is fixed on slide 68, and is adapted to be engaged by pin 47 to impart reciprocatory movement to slide 68.

Figure 12:
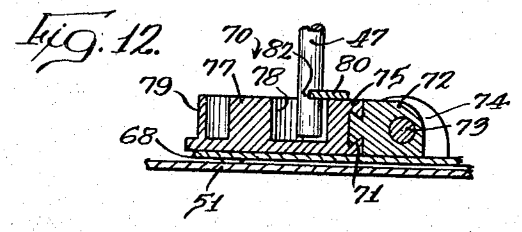
FIG. 12 is a sectional view taken along line 12—12 of FIG. 11.

The right hand end of cam 70, as viewed in FIG. 12, is provided with a female dovetail slot 71, and an adjusting wedge 72 is provided with a male dovetail member which coacts with slot 71. A screw 73 extends transversely between tabs 74 which are struck upwardly from the sides of slide 68, and screw 73 passes through a suitable threaded hole in wedge 72 to provide means for moving the wedge relative to the cam. Thus, it will be readily apparent that means are provided for adjusting the longitudinal position of cam 70 on slide 68.

Cam 70 includes a first upright 75 having a camming surface 76 which is disposed at an angle with respect to the path of movement of the slide 68. Cam 70 further includes a second upright 77, which is shaped generally in the form of a segment of a cylinder, and includes a camming surface 78 which is inclined with respect to the path of travel of slide 68. As can be best seen in FIGS. 4, 5, 7, 11 and 12, camming surfaces 76 and 78 are spaced, and together define an upwardly open channel which is adapted to receive pin 47, as will hereinafter be explained in detail. A third upright 79 is provided on cam 70, and is generally arcuately shaped, and corresponds to the curvature of upright 77.

A lever 80 is pivotally secured to the upper surface of upright 75 by a screw 81, and includes an inclined surface 82 which overlies the channel formed between camming surfaces 76 and 78. The other end of lever 80 is connected by a spring 83 to a tab 84 which extends outwardly from cam 70.

Figures 3, 4:
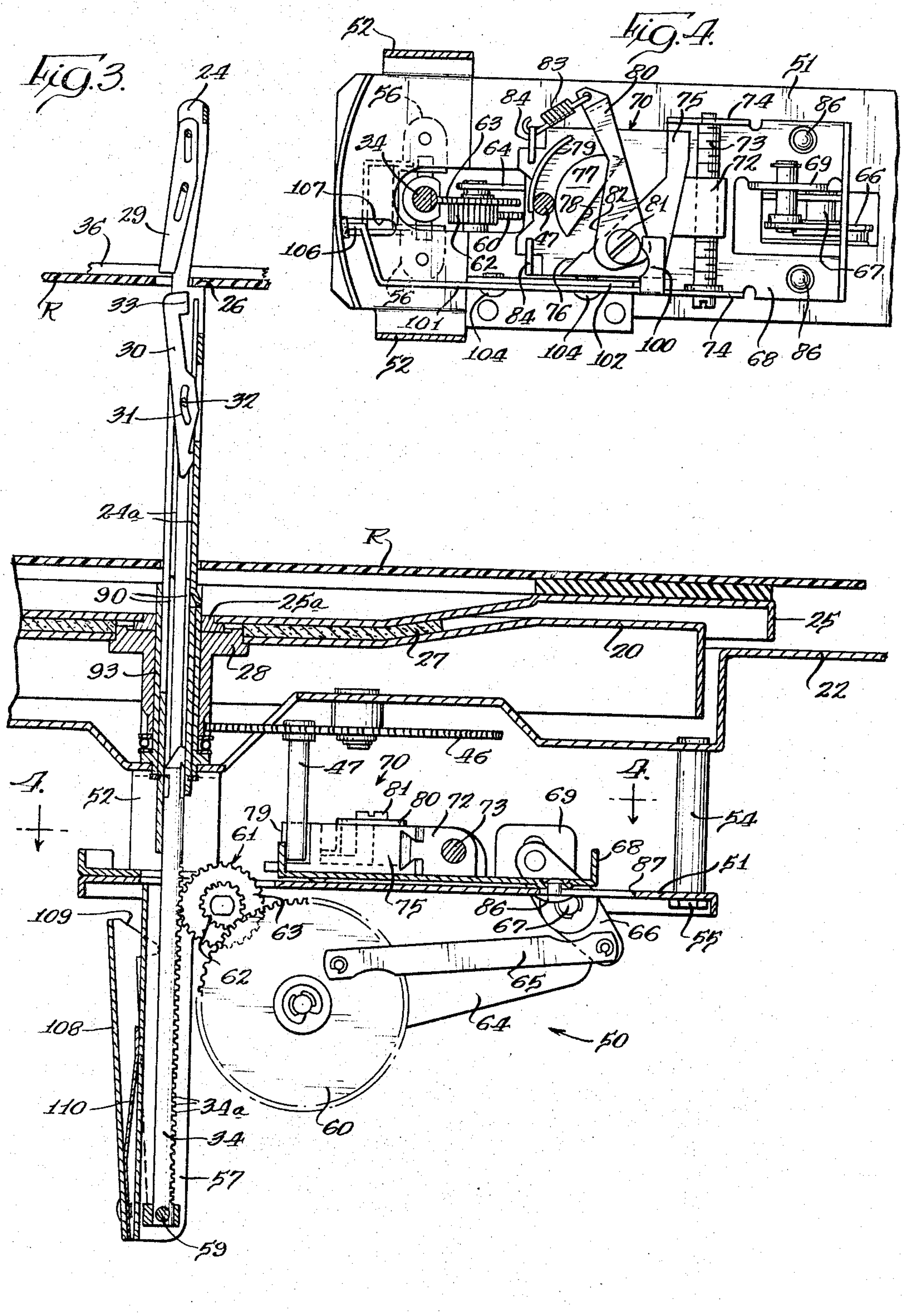
FIG. 3 is a sectional view taken generally along line 3—3 of FIG. 2.
FIG. 4 is a sectional view taken generally along line 4—4 of FIG. 3.

Thus, during a record playing cycle the parts will be in the position shown in FIGS. 3 and 4, with pin 47 being positioned between uprights 77 and 79. After the playing of a record is completed, and a record change cycle begins, gear 46 will rotate and pin 47 will move along an arcuate path from the position shown in FIG. 4, and engage the camming surface 76 on upright 75 to move the slide 68 to the right, as viewed in FIGS. 3 and 5. As can be seen in FIG. 3, dependent members 86 extend downwardly from the slide 68, and cooperate with suitable longitudinal slots 87 in plate 51 to guide the slide 86 in its longitudinal movement relative to plate 51. As slide 68 moves to the right, as viewed in the drawings, bell-crank 66 will be pivoted in a clockwise direction, to move link 65 to the left, and rotate gear 63 in a counterclockwise direction. Rotation of gear 60 in a counterclockwise direction will rotate pinion 61 in a clockwise direction to move push rod 34 vertically upward and actuate ejector lever 30, and the record supporting fingers to be hereafter described. As pin 47 continues to rotate from the position shown in FIG. 4 through the positions shown in FIGS. 5 and 7 and back toward the position shown in FIG. 4, surface 82 of lever 80 will engage the pin 47 and urge it into engagement with the cam surface 78 under the bias of spring 83 as the slide 68 moves to the left, as viewed in the drawings.

Figure 10:
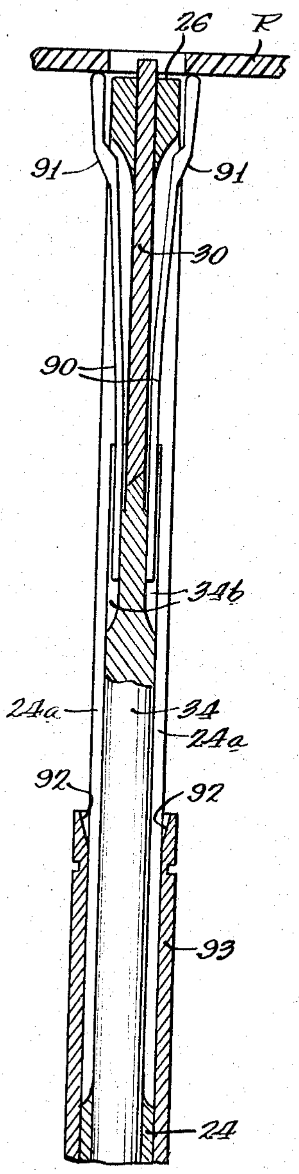
FIG. 10 is a sectional view taken along line 10—10 of FIG. 9.
Figure 11:
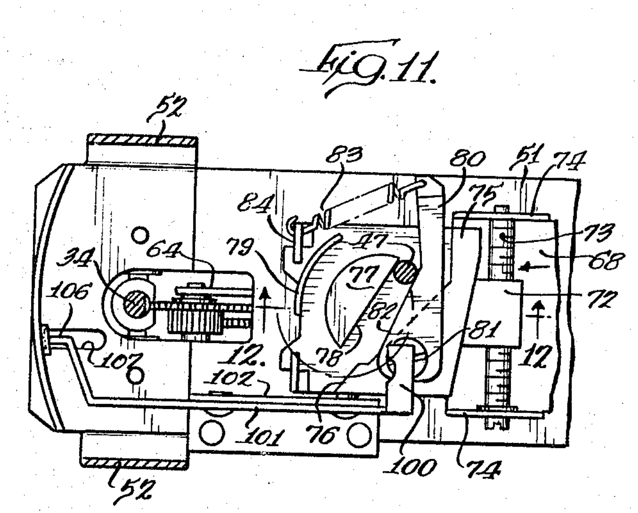
FIG. 11 is a view similar to FIG. 7, but showing the structure at a still further point during the record change cycle.

As can be best seen in FIG. 9 and FIG. 10, push rod 34 includes a portion of reduced diameter 34*b* adjacent its upper end, to which are secured a plurality of record supporting fingers 90. Fingers 90 may be formed of any suitable material, such as by way of example and not limitation, tempered steel stampings, music wire, or plastic. Spindle 24 includes suitable longitudinally extending slots 24*a* through which the fingers 90 extend. While the preferred embodiment shows four fingers and slots, it is not intended to limit the invention to this number of supports and slots, as it is recognized that fewer or more may be readily utilized. Fingers 90 are mounted for retraction into the interior of spindle 24 when the push rod 34 is lowered, and outwardly flared camming surfaces 91 are provided for this purpose. Spindle 24 is received within a supporting sleeve 93, that is fixed on the motor board 22, and sleeve 93 includes outwardly flared camming surfaces 92 which engage finger surfaces 91 as the push rod 34 is lowered to cam the fingers 90 into the interior of the spindle 24. While in the illustrated embodiment the fingers 90 are retracted by flexing, it should also be understood that the fingers 90 may be pivotally secured to the push rod 34 for retraction within the spindle 24.

It has been found that when the ejector lever 30 dislodges the lowermost record of the record stack from the shelf 26, the lowermost record tends to adhere to its adjacent record in the record stack. This adherence between adjacent records would normally cause the lowermost record to hesitate for a short period of time before coming to rest on the record supporting fingers, and thus the record would drop down onto the fingers after they have begun their downward movement toward the turntable. To obviate this problem, the present invention provides means for stopping the upward movement of the fingers momentarily just below the lowermost record of the record stack before the lowermost record has been ejected from the record supporting shelf, and then shifting to a positive lifting means for moving the fingers upwardly in timed relation to catch the lowermost record when it is ejected from the spindle shelf. The push rod is then given a slight additional vertically upward movement to lift the entire record stack a slight increment which facilitates positive separation of the lowermost record from the adjacent record in the record stack when the fingers descend. The means for accomplishing this will be best understood from first considering FIG. 5.

When the parts are in the position shown in FIG. 5, pin 47, through its engagement with cam surface 76, has moved slide 68 to a position immediately adjacent the full extent of its lateral travel. Pin 47 will then move into engagement with a tab 100 on a longitudinally extending lever 101 (FIG. 5). Lever 101 includes a pair of spaced longitudinally extending slots 103, and is mounted for longitudinal sliding movement on slide 68 by a pair of headed connectors 104 which impale slots 103 and suitable aligned openings in a tab 102 which is upwardly struck from the side of slide 68. The left hand end 106 of lever 101 extends downwardly through a suitable opening 107 in plate 51 to a position of engagement with a lever 108 that is pivoted at its lower end to the sides 57 of the push rod bracket. Lever 108 includes an inclined camming surface 109 at the upper end thereof which is movable into engagement with pin 59 on rod 34 by the engagement of lever portion 106 with lever 108 as lever 101 moves to the right.

As may be best seen in FIG. 6, the drive through gears 60 and 61 elevates push rod 34 to a position wherein ejector lever 30 has been moved to the extent of its vertical movement and has begun to pivot to shift the lowermost record on the spindle shelf. In this position fingers 90 are spaced slightly below the lowermost record. After a slight hesitation due to the change over from the gear drive to the more positive drive through levers 101 and 108, the actuation of lever 108 will shift push rod 34 upwardly sufficiently to actuate ejector lever 30 and eject the lowermost record from spindle shelf 26. The movement of push rod 34 by lever 108 also moves fingers 90 into engagement with the lowermost record, as may be best seen in FIG. 10, and camming surface 109 is formed such that the fingers 90 will impart a slight vertical lift to the entire record stack. This causes the flexible fingers 90 to move slightly outwardly to form a broader base to insure that the lowermost record will be lowered without tilting. The lift imparted to the entire record stack also functions to squeeze out the air between the lowermost record and the adjacent record in the record stack, and this breaks down the adherence between the two adjacent lower records, so that the lowermost record is free to move downwardly in constant engagement with the fingers 90.

As may be best seen in FIG. 3, a leaf spring 110 is fixed to the inner wall of lever 108 and bears against the outer surface of bracket 57, so that lever 108 will be returned to the position shown in FIG. 3, after pin 47 has moved out of engagement with tab 100. As is mentioned above the bias of spring 83 enables lever 80 to retain pin 47 against camming surface 78, and thus the lowermost record will move toward the turntable at a controlled rate of speed as pin 47 shifts slide 68 to the left, as viewed in FIG. 11. Movement of slide 68 to the left rotates link 66 in a counterclockwise direction, gear 60 in a clockwise direction, and pinion 61 in a counterclockwise direction, to move the push rod 34 downwardly. When pin 47 has returned to the position shown in FIGS. 3 and 4, the record change cycle is completed, and the lowermost record has been positioned on the turntable in playing position as the playing cycle starts.

I claim:

1. A record changer comprising: a motor board; a turntable positioned above the motor board and mounted thereon for rotation; a spindle extending upwardly centrally of the turntable and supported by the motor board for supporting a stack of records; means for ejecting the lowermost record in said stacks from the spindle for movement to the turntable; means for positively separating the lowermost record from the adjacent record in the record stack by pressing the ejected lowermost record upwardly against the lowest record remaining in the stack; and means movably mounted in said spindle for positively lowering an ejected record during its entire movement of the turntable.

2. A record changer comprising: a motor board; a turntable positioned above the motor board and mounted thereon for rotation; a spindle extending upwardly and centrally of the turntable and supported by the motor board for supporting a stack of records; means for ejecting the lowermost record in said stack from said spindle for movement to the turntable; a rod mounted for movement lengthwise of said spindle; means mounted on said motor board for moving said rod lengthwise of the spindle; retractable support means carried on said rod and extending outwardly of said spindle for receiving the lowermost record of said stack as said record is ejected from said spindle and for controlling the movement of said record during the entire movement to the turntable, said record being deposited on the turntable by said support means; and means for moving said rod upwardly after said lowermost record is on said support means to press the lowermost record against the next uppermost record to assist in positively separating the lowermost record from the adjacent record in the record stack so that the lowermost record will be in constant engagement with the support means throughout its travel to the turntable.

3. A record changer as specified in claim 2 wherein said retractable support means has a cam portion thereon for engaging the turntable to guide said support means within said spindle, said support means remaining within the spindle until a portion of said support means is located at a position above the record deposited on the turntable.

4. A record changer comprising: a motor board; a turntable above the motor board and supported thereon for rotation; a spindle extending upwardly centrally of the turntable and supported by the motor board, said spindle having a shelf for supporting a stack of records above said turntable, said spindle having longitudinal openings therein; means for ejecting the lowermost record in said stack from the shelf for movement to the turntable; retractable support means extending outwardly of said spindle through said openings for receiving a record ejected from said shelf, said support means being mounted for movement lengthwise of said spindle for lowering a record ejected from said shelf to the turntable and depositing said record thereon; means for moving said support means to a height to raise a record along the spindle while the record is still in engagement with a record above; means for retracting said support means within said spindle; and means for passing said support means in retracted position upwardly through the central aperture of the record deposited on said turntable.

5. A record changer comprising: a motor board; a turntable above the motor board and mounted thereon for rotation; a spindle extending upwardly centrally of the turntable and supported by the motor board, said spindle having a shelf for supporting a record stack above said turntable; a lever pivoted to said spindle for ejecting the lowermost record of said stack from said shelf; a push rod mounted for movement lengthwise of said spindle for pivoting said lever to eject the lowermost record of said stack; means for moving said push rod lengthwise of said spindle; retractable support means extending outwardly of said spindle for receiving adjacent said shelf a record ejected from said shelf, said support means being mounted on said push rod for movement therewith for positively lowering said record and depositing it on the turntable, said support means being retractable within said spindle and being returnable to a position adjacent said shelf for receiving another record; and means for moving said push rod upwardly after said lowermost record is on said support means to press the lowermost record against the adjacent record in the record stack and facilitate separation of the records so that the lowermost record will be in constant engagement with the support means throughout its travel to the turntable.

6. A record changer comprising: a motor board; a turntable positioned above the motor board and mounted thereon for rotation; a spindle extending upwardly centrally of the turntable and supported by the motor board for supporting a stack of records; an ejector lever pivoted to said spindle for ejecting the lowermost record in said stack from the spindle for movement to the turntable; a push rod mounted for movement lengthwise of said spindle for pivoting said lever to eject the lowermost record of said stack; record lowering means for positively lowering an ejected record during its entire movement to the turntable; and first means responsive to the rotation of the turntable for moving said push rod in said spindle to initiate pivoting of said ejector lever and to position said record lowering means adjacent but spaced from the lowermost record in the record stack; and second means responsive to rotation of said turntable to complete the movement of the ejector lever and to elevate the record lowering means while engaging the lowermost record in the record stack to press the lowermost record against an adjacent record.

7. A record changer as defined in claim 6 wherein said record lowering means includes retractable record supporting fingers mounted on said push rod and extending outwardly of said spindle, said fingers being adapted to support the lowermost record after actuation of said ejector lever and to lower said record and deposit it on said turntable, and wherein said turntable includes means for retracting said fingers into said spindle.

8. A record changer comprising: a motor board; a turntable positioned above the motor board and mounted thereon for rotation; a spindle extending upwardly centrally of the turntable and supported by the motor board for supporting a stack of records; a pin mounted for revolving movement and driven by the turntable; a slide mounted for reciprocal movement below said motor board; cam means on said slide engaged by said pin to reciprocate said slide during rotation of said gear; a gear train operatively responsive to the reciprocating movement of said slide, and including a driven gear; ejector means for ejecting the lowermost record in said stack from the spindle for movement of said record to the turntable; a push rod mounted for movement lengthwise of said spindle, said push rod having a plurality of rack teeth thereon meshing with said driven gear for moving said push rod upwardly in said spindle when said slide moves in one direction to initiate operation of said ejector means, said push rod moving downwardly in said spindle when said slide moves in the opposite direction; record lowering means associated with said push rod and movable to a position adjacent said record stack as said push rod moves upwardly in said spindle; means for imparting further upward movement to said push rod to complete the operation of said ejector means and to lift said record lowering means upwardly from said position adjacent the record stack to press the ejected record upwardly against the lowest record remaining in the stack to positively separate the ejected record therefrom, said record lowering means moving downwardly with said push rod for positively lowering the ejected record during the entire movement of the record to the turntable as said push rod moves downwardly in said spindle.

9. A record changer as defined in claim 8 wherein means including said revolving pin engaging said cam means are provided for controlling the rate of downward movement of said record lowering means.

10. A record changer comprising: a motor board; a turntable positioned above the motor board and mounted thereon for rotation; a spindle extending upwardly centrally of the turntable and supported by the motor board, said spindle having a shelf for supporting a stack of records; a drive pin movable in an orbital path; a frame below said motor board and secured thereto; a slide mounted for reciprocal movement on said frame; first cam means on said slide engaged by said pin to reciprocate said slide in one direction during rotation of said gear; a gear train operatively responsive to the reciprocating movement of said slide and including a driven gear; ejector means for ejecting the lowermost record in said stack from the spindle shelf for movement to the turntable; a push rod mounted for movement lengthwise of said spindle, said push rod having a plurality of rack teeth thereon meshing with said driven gear; record lowering means associated with said push rod for supporting an ejected record and positively lowering the record during its entire movement to the turntable; said driven gear moving said push rod upwardly in said spindle as said slide moves in one direction to position said record lowering means under said spindle shelf but adjacent thereto; an abutment on said push rod; a lever pivotally mounted on said frame and adapted to engage said abutment; a link reciprocally mounted on said slide and having a first portion adapted to actuate said lever, and a second portion positioned for engagement with said pin after said pin moves out of engagement with said first cam means, the engagement of said pin with said second portion moving said link in one direction to pivot said lever into engagement with said abutment and lift said push rod into engagement with said ejector means to eject the lowermost record of said stack from said spindle shelf and lift the entire record stack to positively separate the lowermost record from the adjacent record in the record stack; and second cam means on said slide engaged by said pin after said pin moves out of engagement with said second portion to move said slide in a second direction and said push rod and record lowering means downwardly in said spindle to positively lower said ejected record during its entire movement to the turntable.

11. A record changer comprising: a motor board; a turntable positioned above the motor board and mounted thereon for rotation; a spindle extending upwardly centrally of the turntable and supported by the motor board for supporting a stack of records; means for ejecting the lowermost record in said stack from the spindle for movement to the turntable; and means movably mounted in said spindle for moving the ejected record upwardly to press against the next record in a stack and assist in positively separating the lowermost record from the adjacent record in the record stack as the ejected record is lowered and for positively lowering an ejected record during its entire movement to the turntable.

12. A record changer comprising: a motor board; a turntable positioned above the motor board and mounted thereon for rotation; a spindle extending upwardly centrally of the turntable and supported by the motor board, said spindle having means for supporting a stack of records; a drive pin movable in an orbital path; a slide mounted for reciprocal movement on said frame; first cam means on said slide engaged by said pin to reciprocate said slide in one direction; means for ejecting the lowermost record in said stack from the spindle shelf for movement to the turntable; a push rod mounted for movement lengthwise of said spindle, a motion transmitting connection between the slide and the push rod; record lowering means associated with said push rod for supporting an ejected record and positively lowering the record during its entire movement to the turntable; said push rod being movable upwardly in said spindle as said slide moves in one direction to position said record lowering means under but adjacent to the lowermost record on the spindle; a lever pivotally mounted on said frame and adapted to engage said push rod; a link reciprocally mounted on said slide and having a first portion adapted to actuate said lever, and a second portion positioned for engagement with said pin after said pin moves out of engagement with said first cam means, the engagement of said pin with said second portion moving said link in one direction to pivot said lever into engagement with said push rod and lift said push rod into engagement with said ejecting means to eject the lowermost record of said stack and lift the entire record stack to positively separate the lowermost record from the adjacent record in the record stack; and second cam means on said slide engaged by said pin after said pin moves out of engagement with said second portion to move slide in a second direction and said push rod and record lowering means downwardly in said spindle to positively lower said ejected record during its entire movement to the turntable.

References Cited

UNITED STATES PATENTS

| | | | |
|---|---|---|---|
| 2,544,230 | 3/1951 | Johnson | 274—10 |
| 2,626,157 | 1/1953 | Jablonski | 274—10 |
| 3,128,101 | 4/1964 | Benwell | 274—10 |
| 3,241,839 | 3/1966 | Morrison | 274—10 |

NORTON ANSHER, *Primary Examiner.*

J. F. PETERS, Jr., *Assistant Examiner.*